US012771967B2

(12) United States Patent
Shibata et al.

(10) Patent No.: US 12,771,967 B2
(45) Date of Patent: Oct. 20, 2026

(54) RADIATION DETECTOR AND RADIATION IMAGING SYSTEM

(71) Applicant: CANON KABUSHIKI KAISHA, Tokyo (JP)

(72) Inventors: Masanori Shibata, Tokyo (JP); Yu Arishima, Kanagawa (JP); Hiroaki Kameyama, Kanagawa (JP); Koichiro Iwata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 19/019,112

(22) Filed: Jan. 13, 2025

(65) Prior Publication Data

US 2025/0240545 A1 Jul. 24, 2025

(30) Foreign Application Priority Data

Jan. 22, 2024 (JP) ................................ 2024-007696

(51) Int. Cl.
*H04N 25/773* (2023.01)
*H04N 25/779* (2023.01)
*H04N 25/78* (2023.01)

(52) U.S. Cl.
CPC ......... *H04N 25/773* (2023.01); *H04N 25/779* (2023.01); *H04N 25/78* (2023.01)

(58) Field of Classification Search
CPC .... H04N 25/773; H04N 25/779; H04N 25/78; H04N 25/30
See application file for complete search history.

(56) References Cited

U.S. PATENT DOCUMENTS

2015/0256778 A1* 9/2015 Kusaka .................. H04N 23/55 348/280
2019/0098231 A1* 3/2019 Iwata .................. H04N 25/704
2020/0005919 A1* 1/2020 Hill, Sr. ................. G16H 10/60
2021/0314508 A1 10/2021 Kusano

FOREIGN PATENT DOCUMENTS

JP 2008103992 A 5/2008
JP 2014072541 A 4/2014
JP 2020202480 A 12/2020
JP 2021166377 A 10/2021

* cited by examiner

*Primary Examiner* — Gevell V Selby
(74) *Attorney, Agent, or Firm* — Canon U.S.A., Inc., IP Division

(57) ABSTRACT

A radiation detector includes a pixel region, a first output line, a second output line, a first signal processing circuit connected to the first output line, and a second signal processing circuit connected to the second output line, wherein the first signal processing circuit includes a first drive circuit connected to the first output line, a first analog-to-digital (AD) conversion circuit, a first holding circuit, and a first scanning circuit, wherein the second signal processing circuit includes a second drive circuit connected to the second output line, a second AD conversion circuit, and a second holding circuit, wherein the first signal processing circuit is disposed between the pixel region and the second signal processing circuit in a planar view, and wherein in the planar view, the first scanning circuit is disposed between the pixel region and the second AD conversion circuit.

12 Claims, 10 Drawing Sheets

RADIATION DETECTOR AND RADIATION IMAGING SYSTEM

BACKGROUND

Technical Field

The present disclosure relates to a radiation detector and a radiation imaging system.

Description of the Related Art

As a method for reading a plurality of pixels at high speed, there is a method of reading signals simultaneously from pixels in a plurality of rows in an imaging apparatus in which pixels are two-dimensionally arranged. In Japanese Patent Application Laid-Open No. 2020-202480, it is discussed that a plurality of analog-to-digital (AD) conversion units each including a current source, an AD conversion circuit, and a holding circuit is arranged in a column direction as an AD converter (ADC) array. It is also discussed that a shift register that supplies a control signal to control transfer of signals output from the AD conversion units is disposed at a position apart from the ADC array. The ADC array is disposed between the shift register and a pixel region in which the plurality of pixels is arranged.

In the imaging apparatus discussed in Japanese Patent Application Laid-Open No. 2020-202480, the control signal is supplied from the shift register to the AD conversion units, and wiring for supplying the control signal is installed across the AD conversion units. In a case where the wiring that supplies the control signal is installed across the AD conversion units, crosstalk may occur, which may lead to degradation of image quality.

SUMMARY

The present disclosure is directed to reducing degradation of image quality.

According to an aspect of the present disclosure, a radiation detector includes a pixel region in which a plurality of pixels configured to convert radiation into electric charge is arranged in a first direction and a second direction intersecting the first direction, a first output line connected to a first pixel among the plurality of pixels; a second output line connected to a second pixel, the first pixel and the second pixel being arranged side by side in the first direction; a first signal processing circuit connected to the first output line; and a second signal processing circuit connected to the second output line. The first signal processing circuit includes a first drive circuit connected to the first output line, a first AD conversion circuit configured to compare signals from the first output line, a first holding circuit configured to hold signals from the first AD conversion circuit, and a first scanning circuit configured to control transfer of signals from the first holding circuit. The second signal processing circuit includes a second drive circuit connected to the second output line, a second AD conversion circuit configured to compare signals from the second output line, and a second holding circuit configured to hold signals from the second AD conversion circuit. The first signal processing circuit is disposed between the pixel region and the second signal processing circuit, viewed from a third direction orthogonal to the first direction and the second direction. Viewed from the third direction, the first scanning circuit is disposed between the pixel region and the second AD conversion circuit.

Further features of the present disclosure will become apparent from the following description of exemplary embodiments with reference to the attached drawings.

DESCRIPTION OF THE EMBODIMENTS

Figure 1:
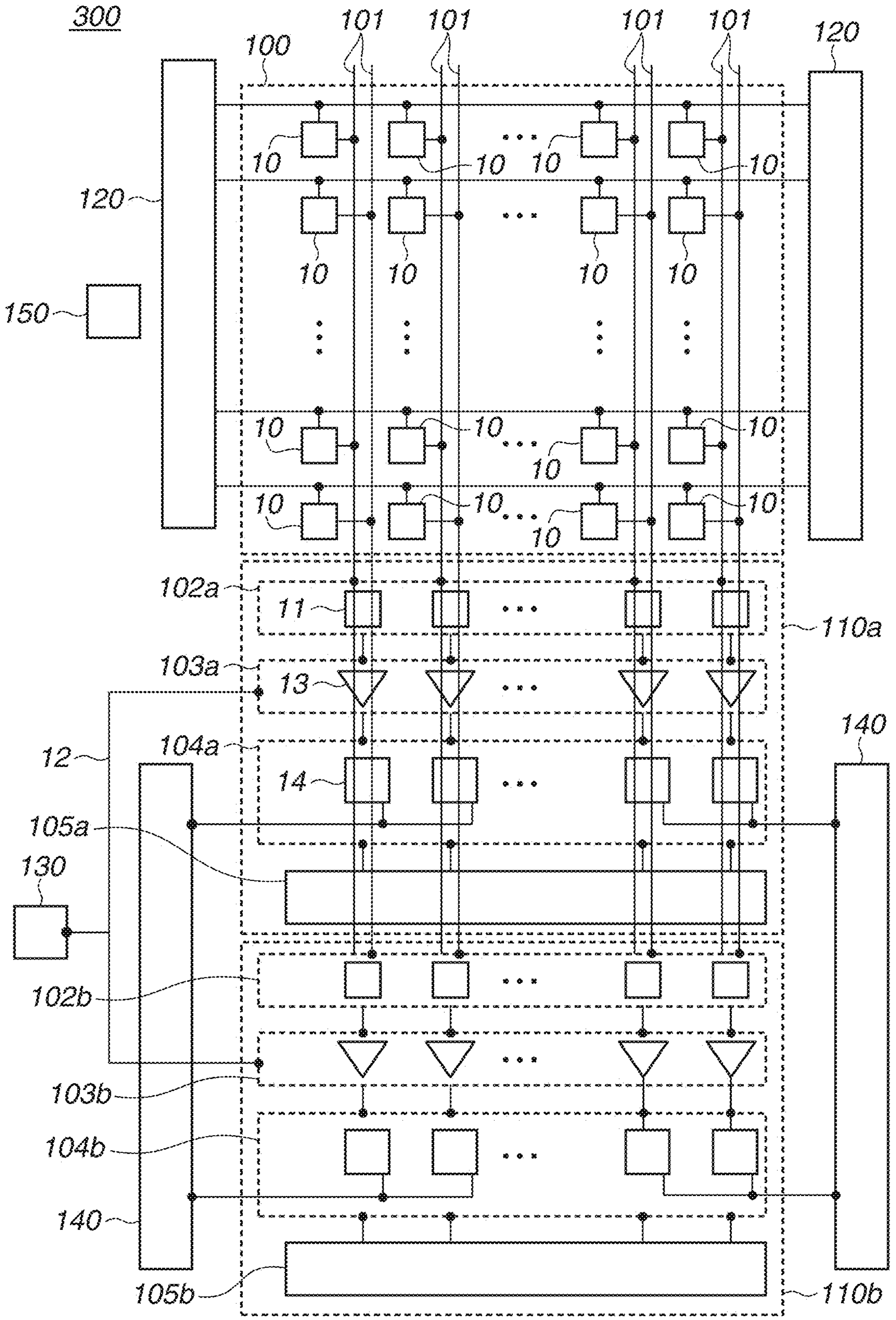
FIG. 1 is a block diagram illustrating a configuration of a radiation detector according to a first exemplary embodiment.

Exemplary embodiments of the present disclosure will be described below with reference to the drawings. The following exemplary embodiments will be described for the purpose of embodying the technical idea of the present disclosure, and are not intended to limit the present disclosure. The sizes and positional relationships of members illustrated in the drawings may be exaggerated for clarity of illustration. In the following description, identical components are denoted by the same reference numeral, and a description thereof may be omitted. Components having identical configurations are denoted by the same reference numeral with an appended alphabetical character, such as “a”, “b”, and “c”, and a description thereof may be omitted. In the following description, terms (e.g., “up”, “down”, “right”, “left”, and other terms including these terms) indicating specific directions and positions are used as appropriate. These terms are used to facilitate understanding of the exemplary embodiments to be described with reference to the drawings. The technical scope of the present disclosure is not limited by the meanings of these terms.

The term “plane” as used herein refers to a surface viewed from a direction perpendicular to a direction in which a plurality of pixels is arranged. For example, in a case where the plurality of pixels is arranged in a matrix, the term “plane” refers to a surface viewed from a third direction that is perpendicular to a first direction (e.g., a row direction) and a second direction (e.g., a column direction). The plane may be viewed from a direction vertical to a surface of a semiconductor layer on which radiation is incident. A cross-section may be a plane in a direction vertical to the surface of the semiconductor layer on which radiation is incident. If the surface of the semiconductor layer on which radiation is incident is a microscopically rough surface, the plane and the cross-section are defined based on the surface viewed macroscopically.

In the exemplary embodiments to be described below, an image sensor as an imaging apparatus is used as an example of a radiation detector. Specifically, a direct conversion type radiation detector including a conversion element for directly converting incident radiation into electric charge will be described below. However, the radiation detector according to the exemplary embodiments is not limited to an imaging apparatus, but is also applicable to other apparatuses. Examples of the radiation detector according to the exemplary embodiments include a distance measurement apparatus (an apparatus for focus detection, distance measurement using Time Of Flight (TOF), or the like) and a photometric apparatus (an apparatus for measuring the quantity of incident light or the like).

In the following description, "radiation" includes non-ionizing radiation (infrared ray, visible light, ultraviolet ray, etc.), electromagnetic radiation (X-ray, gamma ray), and ionizing radiation (electromagnetic radiation and particle radiation). Examples of the electromagnetic radiation include an X-ray and a gamma ray. Examples of the particle radiation include an electron beam, a proton beam, a neutron ray, and an alpha ray. The term "radiation imaging system" as used herein refers to a system in general that obtains an image of an imaging target (an object, a patient for which a medical imaging system is used, or the like) using radiation as electronic data. The term "image" may refer to a still image or a moving image.

In the following exemplary embodiments, connection between circuit elements is described in exemplary cases. In certain cases, even when another element exists between described elements, the described elements of interest are treated as being connected to each other, unless otherwise noted. For example, in circumstances in which an element A is connected to one node of a capacitive element C having a plurality of nodes, and an element B is connected to another node of the capacitive element C, the elements A and B are treated as being connected, unless otherwise noted.

A radiation detector 300 according to a first exemplary embodiment of the present disclosure will be described below with reference to the drawings. In the following descriptions, a vertical (up-down) direction in the drawings may be referred to as a first direction, and a direction perpendicular to the first direction may be referred to as a second (horizontal or right-to-left) direction. The first direction may also be referred to as a row direction, and the second direction may be referred to as a column direction. The first direction and the second direction are not limited to the directions described above. For example, the first direction may be the column direction, and the second direction may be the row direction. The first direction and the second direction are to intersect with each other, but need not be orthogonal to each other.

FIG. 1 is a block diagram illustrating a configuration of the radiation detector 300. The radiation detector 300 includes a pixel region 100, signal readout lines (output lines) 101, signal processing circuits 110, vertical scanning circuits 120, a reference signal generation circuit 130, and digital signal processing circuits 140.

A plurality of pixels 10 is arranged in a two-dimensional array in the pixel region 100. Each pixel 10 includes at least a photodiode, a floating diffusion (FD), a reset transistor, and an amplification transistor. Each pixel 10 may further include a selection transistor. While a configuration of the pixel 10 in which the photodiode and the FD are directly connected to each other is described below, each pixel 10 may also include a transfer transistor connected to a node between the cathode of the photodiode and the gate of the amplification transistor.

The photodiode is a conversion element for directly converting incident radiation into electric charge. The anode of the photodiode is connected to a reference voltage node, and the cathode of the photodiode is connected to each of the source of the reset transistor and the gate of the amplification transistor. The FD functions as a connection node that connects the cathode of the photodiode, the source of the reset transistor, and the gate of the amplification transistor to each other. The FD also functions as a charge holding unit. The photodiode may detect electromagnetic radiation (X-ray, gamma ray) and particle radiation (electron beam, proton beam, neutron ray, alpha ray, etc.).

The drain of the reset transistor is connected to a power supply voltage node to which a power supply voltage is supplied. The drain of the selection transistor is connected to the amplification transistor, and the source of the selection transistor is connected to the corresponding output lines 101. The output lines 101 are connected to a current source.

The gate of the reset transistor and the gate of the selection transistor are each connected to a signal line for transmitting control signals from the vertical scanning circuits 120. The signal line is a line common to a corresponding row of pixels 10.

When radiation is incident on the pixel 10, the photodiode converts the radiation into electric charge (signal electric charge) and stores the electric charge. The electric charge converted by the photodiode is transferred to the FD. The amplification transistor amplifies a pixel signal based on the electric charge held in the FD and outputs the pixel signal to the selection transistor. The selection transistor outputs the pixel signal to the corresponding output lines 101 based on the control signal from the vertical scanning circuits 120. The reset transistor resets the FD to a voltage corresponding to the power supply voltage based on the control signal from the vertical scanning circuits 120.

An image capturing frame rate is, for example, several tens to several hundreds of frames per second (fps). A rate of radiation is less than or equal to 0.5/pix/frm. In other words, image capturing is performed at a low irradiation rate such that the probability of incidence of radiation on one pixel at certain time is less than ½. A unit [/pix/frm] represents an average value (expected value) of the number of incident particles or photons of radiation per frame, and per pixel. For example, as the irradiation rate when an X-ray is used, the average value of the number of incident photons per frame and per pixel is less than or equal to 0.5. As the irradiation rate when an electron beam is used, the average value of the number of incident electrons per frame and per pixel is less than or equal to 0.5.

The rate of radiation may be lower than 0.5/pix/frm. For example, the rate of radiation may be set to less than or equal to 0.1/pix/frm, or less than or equal to 0.05/pix/frm.

The number of rows and the number of columns of the pixels 10 arranged in the pixel region 100 are provided for explanation and are not so limited.

In the pixel region 100, not only an effective pixel that outputs a pixel signal corresponding to the amount of incident radiation, but also a light-shielded pixel in which the photodiode is shielded from light, a dummy pixel that does not output any signals, a NULL pixel, and the like may be arranged. The NULL pixel is a pixel that includes neither the photodiode nor the FD, unlike the effective pixel and the light-shielded pixel.

Each signal processing circuit 110 is configured to include a drive circuit 102, an AD conversion circuit 103, a holding circuit 104, and a horizontal scanning circuit 105. In the first exemplary embodiment, a plurality of signal processing circuits 110 is arranged side by side in the first direction. In FIG. 1, two signal processing circuits 110*a* (first signal processing circuit) and 110*b* (second signal processing circuit) are arranged side by side in the first direction. In other words, the signal processing circuit 110*a* is arranged between the pixel region 100 and the signal processing circuit 110*b* in a planar view, i.e., viewed from a third direction that is orthogonal to the first direction and the second direction. Components included in each of the signal processing circuits 110*a* and 110*b* are identical to the components of the signal processing circuit 110, as described herein.

Each output line 101 connects the drive circuit 102 and the pixel region 100 to each other. The vertical scanning circuits 120 read analog signals generated in the photodiodes for each selected row via the output lines 101. In the planar view, the drive circuit 102 is disposed between the pixel region 100 and the AD conversion circuit 103, and is connected to the pixel region 100 and the AD conversion circuit 103.

The drive circuit 102 controls the potential of the output lines 101, and includes a plurality of drive circuit units 11 each including a current source that causes a current to flow to the corresponding output lines 101. In the first exemplary embodiment, two output lines 101 are provided for each photodiode in each column. One of the two output lines 101 is connected to a drive circuit 102*a* of the signal processing circuit 110*a*, and the other of the two output lines 101 is connected to a drive circuit 102*b* of the signal processing circuit 110*b*. In other words, the photodiode of each pixel 10 (first pixel) in a certain row is connected to the drive circuit 102*a* (first drive circuit) of the signal processing circuit 110*a* via a first output line. The photodiode of each pixel 10 (second pixel) in another row different from the row of the first pixel and in the same column as that of the first pixel is connected to the drive circuit 102*b* (second drive circuit) of the signal processing circuit 110*b* via a second output line.

The AD conversion circuit 103 is connected to each of the drive circuit 102 and a reference signal line 12, and includes a plurality of AD conversion circuit units 13 for AD conversion. Each of the AD conversion circuit units 13 converts an analog signal input from the drive circuit 102 into a digital signal based on a reference signal input from the reference signal generation circuit 130 via the reference signal line 12 and outputs the digital signal. The reference signal is, for example, a ramp signal with a signal level that increases or decreases with time.

An AD conversion circuit 103*a* (first AD conversion circuit) is connected to the drive circuit 102*a*, and an AD conversion circuit 103*b* (second AD conversion circuit) is connected to the drive circuit 102*b*.

The reference signal generation circuit 130 is disposed only on the left side of the signal processing circuits 110*a* and 110*b* in the planar view. A counter that is connected to a plurality of holding circuit units 14 included in the holding circuit 104 is also disposed only on the left side of the signal processing circuits 110*a* and 110*b*. The reference signal generation circuit 130 is disposed at a position equidistant from the signal processing circuit 110 that is closest to the pixel region 100 and the signal processing circuit 110 that is farthest from the pixel region 100 among the plurality of signal processing circuits 110 disposed below the pixel region 100. In other words, the reference signal generation circuit 130 is disposed on an extension of a central line passing through the plurality of signal processing circuits 110. For example, in a case where there are two signal processing circuits 110, the reference signal generation circuit 130 is disposed on an extension of a line passing through the two signal processing circuits 110. This layout makes it possible to reduce variations in signals supplied from the reference signal generation circuit 130. On the other hand, the digital signal processing circuits 140 are disposed on the right and left sides of the signal processing circuits 110*a* and 110*b* in the planar view.

The holding circuit 104 is connected to the AD conversion circuit 103, and includes the plurality of holding circuit units 14 for holding pixel signals processed by the AD conversion circuit 103. Each holding circuit unit 14 may function as a memory. A holding circuit 104*a* is connected to the AD conversion circuit 103*a*, and a holding circuit 104*b* is connected to the AD conversion circuit 103*b*.

The horizontal scanning circuit 105 includes at least a shift register and may further include a decoder. The horizontal scanning circuit 105 is connected to the holding circuit 104 and sequentially scans the holding circuit units 14. The pixel signals held in each of the holding circuit units 14 are sequentially transferred to the digital signal processing circuits 140 that process, for example, digital signals from a digital front-end or the like. In this case, it is desirable that the digital signal processing circuits 140 are not disposed in a direction in which the signal processing circuit 110*a* and the signal processing circuit 110*b* are aligned. FIG. 1 illustrates an example where the digital signal processing circuits 140 are disposed in the second direction with respect to the signal processing circuit 110*a*. This layout prevents wires through which signals output from the horizontal scanning circuit 105 pass from overlapping the signal processing circuit 110*b* in the planar view, thereby avoiding crosstalk.

A detailed configuration of each of the signal processing circuits 110*a* and 110*b* according to the first exemplary embodiment will be described with reference to FIG. 2.

A method for connecting the pixels 10, the output lines 101, and the drive circuit units 11 according to the first exemplary embodiment is described below. The pixels 10 among the plurality of pixels 10 included in the pixel region 100 are arranged in four rows and two columns. Two output lines 101 are connected to the pixels 10 in one column. One drive circuit unit 11, one AD conversion circuit unit 13, and one holding circuit unit 14 are provided for each of the output lines 101. Specifically, an output line 101*a* is connected to pixels 10*a* and 10*c*, and a drive circuit unit 11*a*, an AD conversion circuit unit 13*a*, and a holding circuit unit 14*a* in the signal processing circuit 110*a* are provided to the output line 101*a*. An output line 101*b* is connected to pixels 10*b* and 10*d*, and a drive circuit unit 11*b*, an AD conversion circuit unit 13*b*, and a holding circuit unit 14*b* in the signal processing circuit 110*b* are provided to the output line 101*b*. The output line 101*a* is connected to the drive circuit unit 11*a*, and the output line 101*b* is connected to the drive circuit unit 11*b*.

A signal output from the drive circuit unit 11*a* is input to the AD conversion circuit unit 13*a*, and a signal output from the AD conversion circuit unit 13*a* is input to the holding circuit unit 14*a*.

The signal processing circuit 110*a* includes a horizontal scanning circuit 105*a* (first horizontal scanning circuit), and the signal processing circuit 110*b* includes a horizontal scanning circuit 105*b* (second horizontal scanning circuit). The horizontal scanning circuit 105*a* is connected to the holding circuit 104*a* (first holding circuit) and controls transfer of a signal from the holding circuit 104*a*. The horizontal scanning circuit 105*b* is connected to the holding circuit 104*b* (second holding circuit) and controls transfer of a signal from the holding circuit 104*b*. In the planar view, the horizontal scanning circuit 105*a* is arranged between the pixel region 100 and the horizontal scanning circuit 105*b*.

In the first exemplary embodiment, the drive circuit 102*a*, the AD conversion circuit 103*a*, the holding circuit 104*a*, the horizontal scanning circuit 105*a*, the drive circuit 102*b*, the AD conversion circuit 103*b*, the holding circuit 104*b*, and the horizontal scanning circuit 105*b* are arranged in this order in the first direction.

A connection method similar to that described above is repeatedly applied to connect pixels 10*e* to 10*h* that are arranged in an adjacent column and pixels 10 in rows subsequent to that of the pixel 10*d*.

In the first exemplary embodiment, the output lines 101 connected to each of the drive circuits 102 extend to the drive circuit 102*b* of the signal processing circuit 110*b*, and have a substantially uniform wiring length. The term "substantially uniform" indicates that, for example, a difference between the wiring length of the output line 101*a* and the wiring length of the output line 101*b* is less than or equal to 50 nm. This layout makes it possible to arrange the output lines 101 so that a wiring load thereon is substantially uniform.

Figure 2:
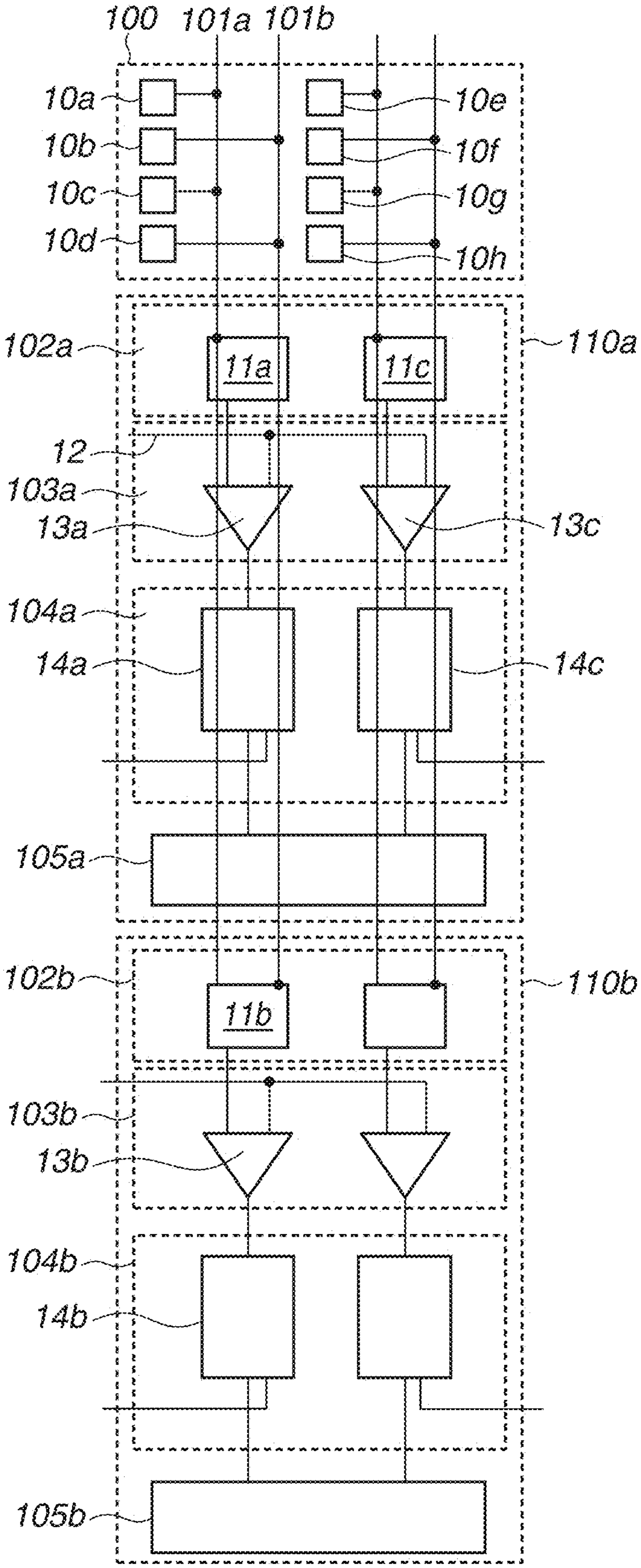
FIG. 2 is a diagram illustrating a detailed configuration of a circuit in the radiation detector according to the first exemplary embodiment.

While FIG. 2 illustrates a case where two output lines 101 are arranged for each pixel column, a plurality of output lines 101 may be arranged for each pixel column. In this case, the drive circuit unit 11, the AD conversion circuit unit 13, and the holding circuit unit 14 are arranged for each output line 101.

According to the first exemplary embodiment, the plurality of signal processing circuits 110*a* and 110*b* is arranged, and the horizontal scanning circuit 105*a* is disposed between the pixel region 100 and the AD conversion circuit 103*b* in the planar view.

With this configuration, wires through which the control signals supplied from the horizontal scanning circuit 105 pass can be prevented from being arranged across, i.e. do not cross, other signal processing circuits 110. Accordingly, crosstalk and degradation of image quality can be reduced.

Figure 3:
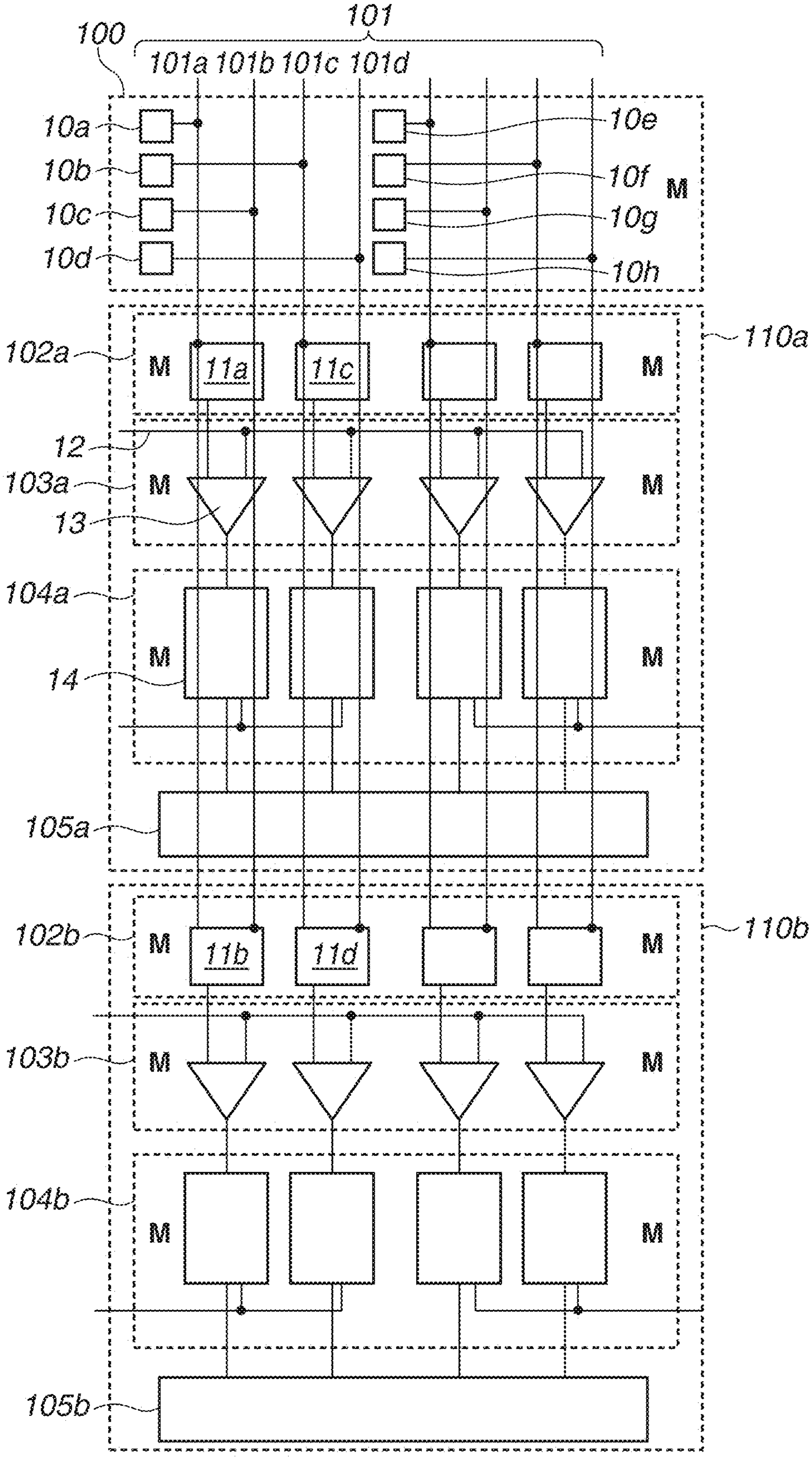
FIG. 3 is a diagram illustrating a configuration of a radiation detector according to a modification of the first exemplary embodiment.

FIG. 3 illustrates a modification of the first exemplary embodiment. In the modification, four rows and two columns of pixels 10 are provided, with four output lines 101 arranged for each pixel column. In the present exemplary embodiment, two output lines 101 are connected to each of the signal processing circuits 110*a* and 110*b*, and the signal processing circuits 110*a* and 110*b* each include two drive circuit units 11, two AD conversion circuit units 13, and two holding circuit units 14. In other words, two drive circuit units 11, two AD conversion circuit units 13, and two holding circuit units 14 are arranged for one pixel 10.

The pixel 10*a* is connected to the output line 101*a* and is connected to the drive circuit 102*a* of the signal processing circuit 110*a*. The output line 101*a* is connected to the drive circuit unit 11*a* of the drive circuit 102*a*. The pixel 10*b* is connected to the output line 101*c* and is connected to the drive circuit 102*a* of the signal processing circuit 110*a*. The output line 101*b* is connected to the drive circuit unit 11*b* of the drive circuit 102*b*. The pixel 10*c* is connected to an output line 101*b* and is connected to the drive circuit 102*b* of the signal processing circuit 110*b*. The output line 101*c* is connected to a drive circuit unit 11*c* of the drive circuit 102*a*. The pixel 10*d* is connected to an output line 101*d* and is connected to the drive circuit 102*b* of the signal processing circuit 110*b*.

The output line 101*d* is connected to a drive circuit unit 11*d* of the drive circuit 102*b*. The above-described connection method is repeatedly applied to connect the pixels 10*e* to 10*h* in the next column and pixels 10 in subsequent columns and rows.

The holding circuit unit 14 that holds pixel signals from the pixels 10*a*, 10*b*, 10*c*, and 10*d* transfers the signals to the digital signal processing circuit 140 disposed on the left side. The holding circuit unit that holds pixel signals from the pixel 10*e*, 10*f*, 10*g*, and 10*h* transfers the signals to the digital signal processing circuit 140 disposed on the right side. With this configuration, signals can be read at higher speed than in a case where the digital signal processing circuit 140 is disposed on one side to process the signals. Not limited to this configuration, the digital signal processing circuit 140 may be disposed on one of the right and left sides to which pixel signals from the pixels 10*a* to 10*d* are transferred.

According to the present exemplary embodiment, the arrangement of the plurality of signal processing circuits 110 makes it possible to arrange more output lines 101 for output from the holding circuit units 14, which leads to a reduction in transfer time. The arrangement of the plurality of signal processing circuits 110 each configured as one block facilitates the layout design. Further, since wires through which control signals supplied from a certain horizontal scanning circuit 105 pass can be connected without being arranged across other signal processing circuits 110, crosstalk can be reduced. According to the present exemplary embodiment, it is possible to prevent signals output from each of the signal processing circuits 110 from being output across other signal processing circuits 110. For example, the signal processing circuit 110*a* illustrated in FIG. 1 can output signals without outputting the signals across the signal processing circuit 110*b*. Consequently, the number of wires overlapping the signal processing circuit 110*b* can be reduced, and crosstalk can be reduced.

Figure 4:
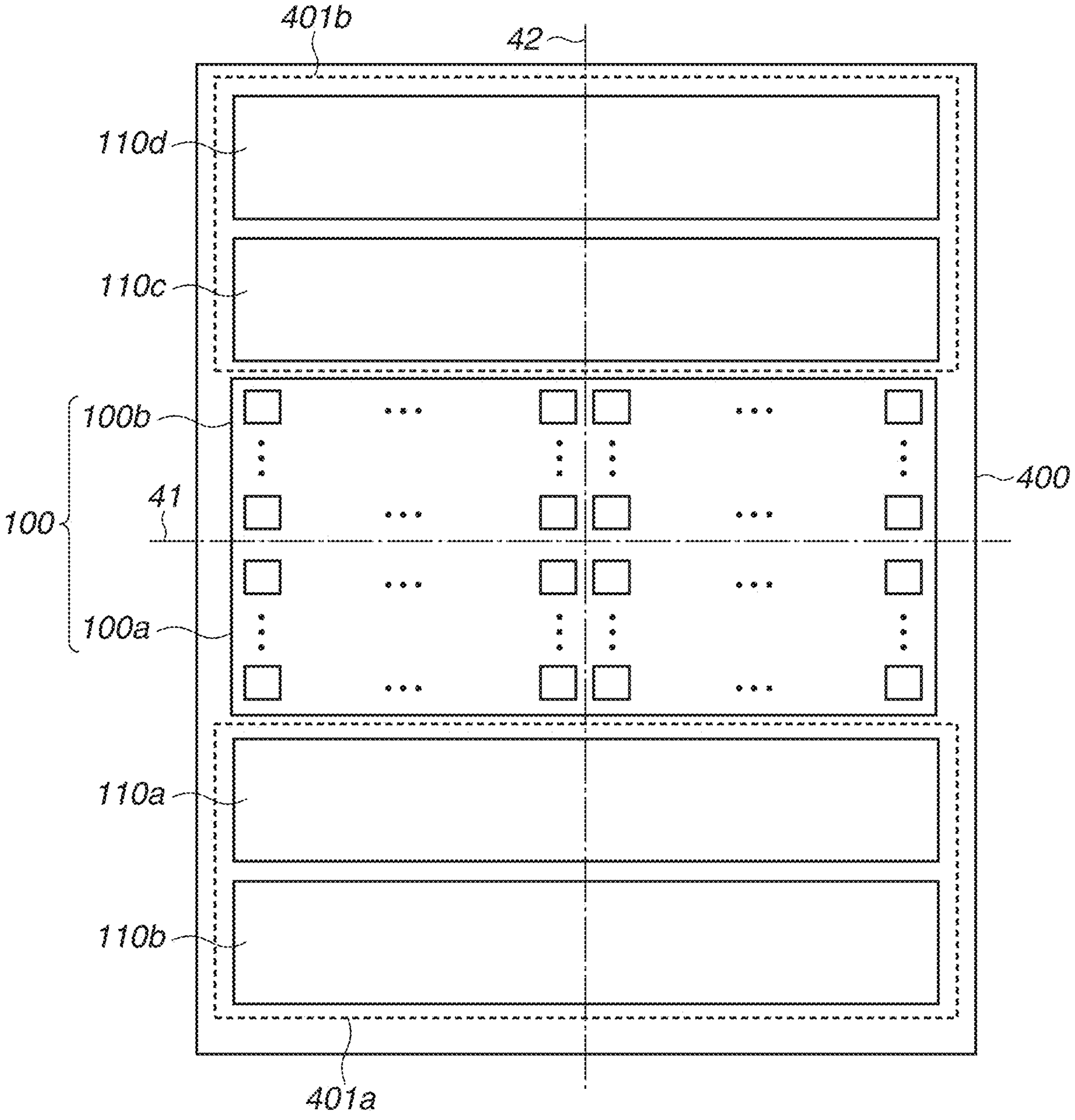
FIG. 4 is a block diagram illustrating a configuration of a radiation detector according to a second exemplary embodiment.

FIG. 4 illustrates a radiation detector according to a second exemplary embodiment. The radiation detector according to the second exemplary embodiment differs from the radiation detector according to the first exemplary embodiment in that the plurality of signal processing circuits 110 is arranged above and below the pixel region 100. The second exemplary embodiment is substantially the same as the first exemplary embodiment except for this difference and differences described below. For conciseness, description of similar components is incorporated by reference herein.

The radiation detector according to the second exemplary embodiment includes the pixel region 100 and a circuit region 401 arranged on a semiconductor substrate 400. The pixel region 100 is also arranged on the semiconductor substrate 400. A circuit region 401*a* is arranged below the pixel region 100, and a circuit region 401*b* is arranged above the pixel region 100. The plurality of signal processing circuits 110 is arranged on each of the circuit regions 401*a* and 401*b*.

Figure 6:
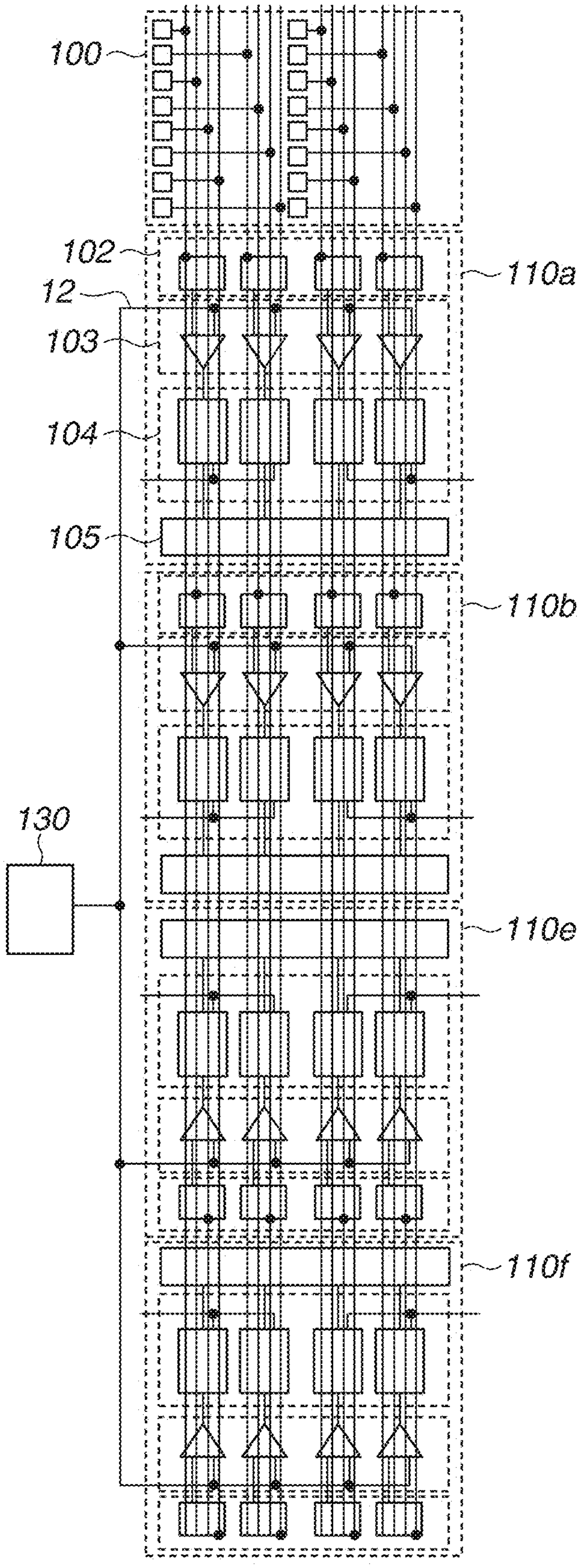
FIG. 6 is a block diagram illustrating a configuration of a radiation detector according to a fourth exemplary embodiment.

The circuit region 401*a* includes the signal processing circuits 110*a* and 110*b*. The circuit region 401*b* includes a signal processing circuit 110*c* (fifth signal processing circuit) and a signal processing circuit 110*d* (sixth signal processing circuit). A third signal processing circuit 110*e* and a fourth signal processing circuit 110*f* are illustrated in FIG. 6.

The signal processing circuit 110*c* is connected to a fifth output line connected to a fifth pixel. The signal processing circuits 110*c* and 110*d* include the same components as those of the signal processing circuits 110*a* and 110*b*. Specifically, the signal processing circuit 110*c* includes a drive circuit (fifth drive circuit), an AD conversion circuit (fifth AD conversion circuit), a holding circuit (fifth holding circuit), and a horizontal scanning circuit (fifth horizontal scanning circuit). The signal processing circuit 110*d* is connected to a sixth output line connected to a sixth pixel. The signal processing circuit 110*d* includes a drive circuit (sixth drive circuit), an AD conversion circuit (sixth AD conversion circuit), a holding circuit (sixth holding circuit), and a horizontal scanning circuit (sixth horizontal scanning circuit). The signal processing circuit 110*c* and the signal processing circuit 110*d* are arranged in mirror symmetry with respect to the signal processing circuits 110*a* and 110*b* across the pixel region 100.

A horizontal central line 41 represents a central position in the row direction of the pixel region 100. In circumstances in which the horizontal central line 41 is a boundary, the pixels 10 in a pixel region 100*a* below the horizontal central line 41 are connected to the signal processing circuits 110*a* and 110*b* in the circuit region 401*a*, while the pixels 10 in a pixel region 100*b* above the horizontal central line 41 are connected to the signal processing circuits 110*c* and 110*d* in the circuit region 401*b*. The pixel region 100*b* and the circuit region 401*b* are arranged such that the pixel region 100*a* and the circuit region 401*a* are arranged in a vertically inverted manner.

A vertical central line 42 represents a central position in the column direction of the pixel region 100. In circumstances in which the vertical central line 42 is a boundary, the holding circuit units 14 arranged on the left side of the vertical central line 42 transfer pixel signals to the digital signal processing circuit 140 arranged on the left side, while the holding circuit units 14 arranged on the right side of the vertical central line 42 transfer pixel signals to the digital signal processing circuit 140 arranged on the right side. While FIG. 4 illustrates two signal processing circuits 110 disposed to the pixel region 100, two or more signal processing circuits 110 may be disposed side by side.

In the vicinity of the pixel region 100, a temperature detection sensor 150 for measuring the temperature in the pixel region 100 may be disposed. The temperature detection sensor 150 is composed of, for example, an element formed of a PN junction, such as a diode.

Although a pixel signal readout direction varies with the horizontal central line 41 or the vertical central line 42 as the boundary, the following method may be used to synchronize the transfer of pixel signals to each circuit block. Frequency of signals from a main clock for driving each block are divided and multiplied by a phase-locked loop (PLL). Further, signal lines for the signals are made equal in wiring length and installed so as to have the same load, thereby synchronizing the transfer of signals, when a power supply for each circuit block is supplied from a common power supply line.

Figure 5:
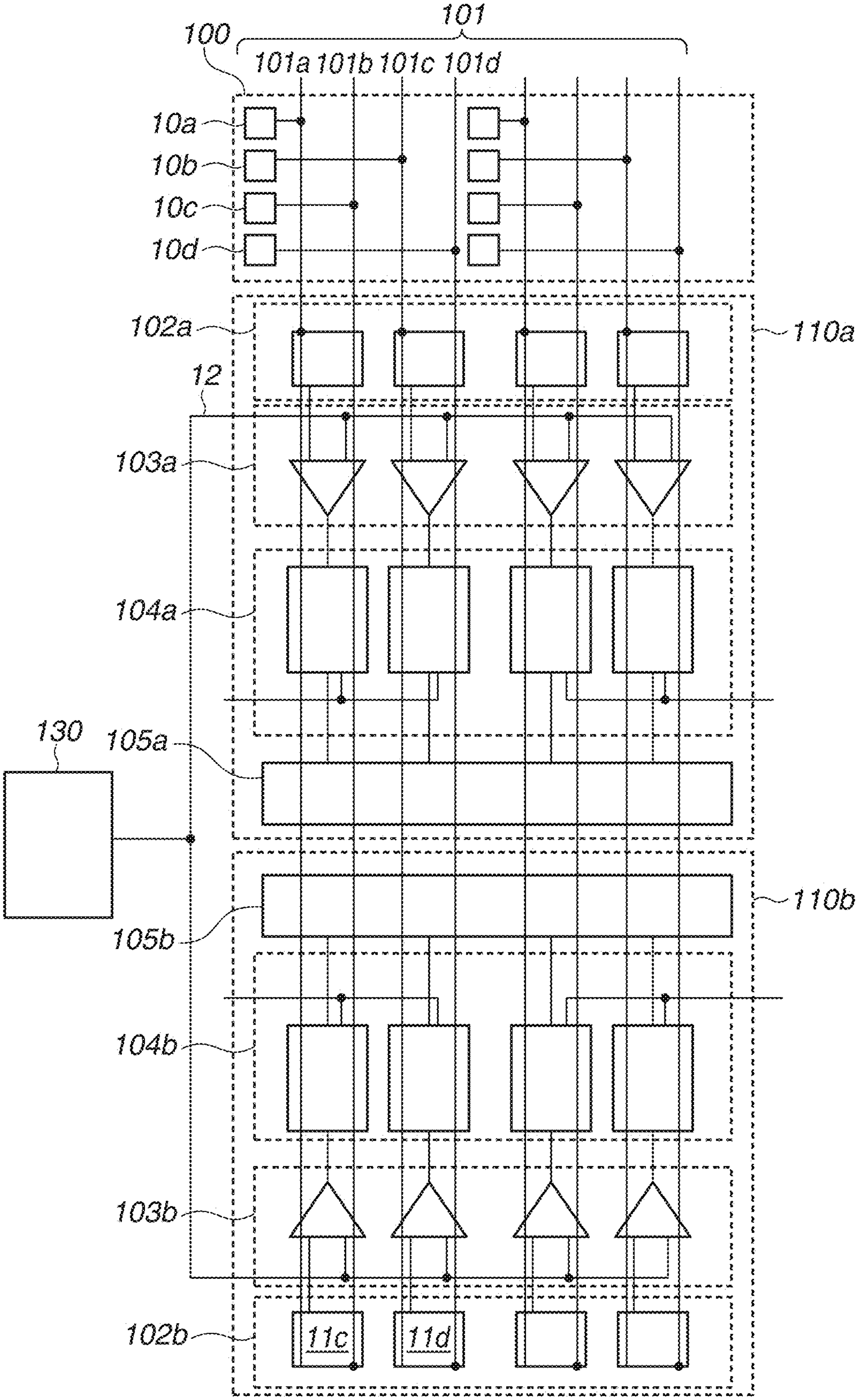
FIG. 5 is a block diagram illustrating a configuration of a radiation detector according to a third exemplary embodiment.

FIG. 5 illustrates a radiation detector according to a third exemplary embodiment. The radiation detector according to the third exemplary embodiment differs from the radiation detector according to the first exemplary embodiment in the arrangement order of the components included in the signal processing circuit 110*b*. The third exemplary embodiment is substantially the same as the first exemplary embodiment except for this difference and differences described below. For conciseness, description of similar components is incorporated by reference herein.

The signal processing circuit 110*b* is vertically inverted with respect to the signal processing circuit 110*a*. In other words, the signal processing circuit 110*a* and the signal processing circuit 110*b* are arranged in mirror symmetry with respect to a line passing between the signal processing circuits 110*a* and 110*b*. In the planar view, the drive circuit 102*a*, the AD conversion circuit 103*a*, the holding circuit 104*a*, the horizontal scanning circuit 105*a*, the horizontal scanning circuit 105*b*, the holding circuit 104*b*, the AD conversion circuit 103*b*, and the drive circuit 102*b* are arranged in this order in the first direction.

The reference signal generation circuit 130 is commonly connected to the reference signal line 12 of the signal processing circuit 110*a* and the reference signal line 12 of the signal processing circuit 110*b*. In the signal processing circuit 110*b*, the horizontal scanning circuit 105*b*, the holding circuit 104*b*, the AD conversion circuit 103*b*, and the drive circuit 102*b* are arranged in this order from a side close to the pixel region 100. The reference signal generation circuit 130 is arranged in the vicinity of the boundary between the signal processing circuit 110*a* and the signal processing circuit 110*b*.

According to the present exemplary embodiment, the signal processing circuit 110*b* is arranged in a vertically inverted manner, thereby making it possible to easily match a signal load of the reference signal line 12 input to the signal processing circuit 110*a* with the signal load of the reference signal line 12 input to the signal processing circuit 110*b*. It is also possible to share a power supply at the boundary between the signal processing circuit 110*a* and the signal processing circuit 110*b*.

While FIG. 5 illustrates the signal processing circuit 110*b* disposed in a vertically inverted manner, the present exemplary embodiment is not limited thereto. The signal processing circuit 110*a* may be disposed in a vertically inverted manner, and the signal processing circuit 110*b* may be disposed without being vertically inverted.

FIG. 6 illustrates a radiation detector according to a fourth exemplary embodiment. The radiation detector according to the fourth exemplary embodiment differs from the radiation detector according to the first exemplary embodiment in that the radiation detector according to the fourth exemplary embodiment includes four signal processing circuits 110*a*, 110*b*, 110*e*, and 110*f*, which are vertically inverted. The fourth exemplary embodiment is substantially the same as the first exemplary embodiment except for this difference and differences described below. For conciseness, description of similar components is incorporated by reference herein.

In FIG. 6, the first signal processing circuit 110*a*, the second signal processing circuit 110*b*, the third signal processing circuit 110*e*, and the fourth signal processing circuit 110*f* are disposed side by side in the first direction with respect to the pixel region 100. The third signal processing circuit 110*e* and the fourth signal processing circuit 110*f* each include the same components as those described with respect to the signal processing circuit 110*a* and the signal processing circuit 110*b*. Specifically, the third signal processing circuit 110*e* is connected to a third output line connected to a third pixel. The signal processing circuit 110*e* includes a drive circuit (third drive circuit), an AD conversion circuit (third AD conversion circuit), a holding circuit (third holding circuit), and a horizontal scanning circuit (third horizontal scanning circuit). The fourth signal processing circuit **110*f* is connected to a fourth output line connected to a fourth pixel. The signal processing circuit 110*f* includes a drive circuit (fourth drive circuit), an AD conversion circuit (fourth AD conversion circuit), a holding circuit (fourth holding circuit), and a horizontal scanning circuit (fourth horizontal scanning circuit). In the planar view, the horizontal scanning circuit of the signal processing circuit 110*b* is arranged between the horizontal scanning circuit of the signal processing circuit 110*a* and the horizontal scanning circuit of the signal processing circuit 110*e***.

The third signal processing circuit **110*e* and the fourth signal processing circuit 110*f* are arranged in a vertically inverted manner, and the first signal processing circuit 110*a* and the second signal processing circuit 110*b* are arranged without being vertically inverted. In other words, the first signal processing circuit 110*a* and the second signal processing circuit 110*b* are arranged in translational symmetry, the third signal processing circuit 110*e* and further the signal processing circuit 110*f* are also arranged in translational symmetry, with the signal processing circuit 110*b* and the signal processing circuit 110*e*** being arranged in mirror symmetry.

The reference signal generation circuit 130 is disposed on an extension of the boundary between the signal processing circuit **110*b* and the signal processing circuit 110*e*. The reference signal generation circuit 130 is commonly connected to the signal processing circuits 110*a* and 110*b*, 110*e*, and 110*f* via the reference signal lines 12**.

The signal processing circuits 110 are disposed in a vertically inverted manner with respect to the boundary between the signal processing circuit **110*b* and the signal processing circuit 110*e*. More specifically, the third signal processing circuit 110*e* and the fourth signal processing circuit 110*f* are disposed in a vertically inverted manner with respect to the first signal processing circuit 110*a* and the second signal processing circuit 110*b*. For example, one half of the number of signal processing circuits 110** is vertically inverted.

While FIG. 6 illustrates four signal processing circuits 110, the number of signal processing circuits 110 may be changed depending on the number of pixels 10. For example, six signal processing circuits 110 or eight signal processing circuits 110 may be disposed.

According to the present exemplary embodiment, the plurality of signal processing circuits 110 is disposed, unlike in the first and second exemplary embodiments, so that signals can be read at higher speed.

Figure 7:
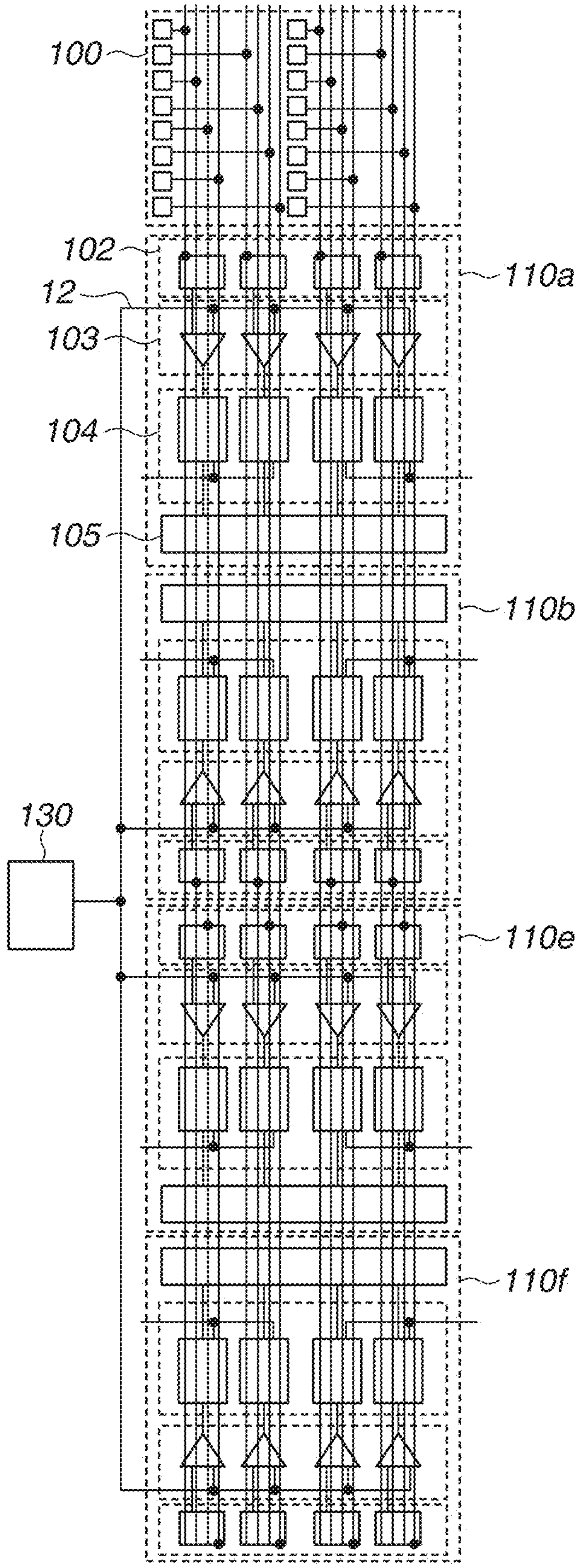
FIG. 7 is a block diagram illustrating a configuration of a radiation detector according to a fifth exemplary embodiment.

FIG. 7 illustrates a radiation detector according to a fifth exemplary embodiment. The radiation detector according to the fifth exemplary embodiment differs from the radiation detector according to the fourth exemplary embodiment in that the signal processing circuits 110 that are not vertically inverted and the signal processing circuits 110 that are vertically inverted are alternately disposed. The fifth exemplary embodiment is substantially the same as the fourth exemplary embodiment except for this difference and differences described below. For conciseness, description of similar components is incorporated by reference herein.

In FIG. 7, one of the adjacent signal processing circuits 110 is disposed in a vertically inverted manner with respect to the other of the adjacent signal processing circuits 110. If the signal processing circuit **110*a* is disposed in a non-vertically inverted manner, the signal processing circuit 110*b* that is disposed adjacent to the signal processing circuit 110*a* is disposed in the vertically inverted manner, the signal processing circuit 110*e* is disposed in the non-vertically inverted manner, and the signal processing circuit 110*f* is disposed in the vertically inverted manner. In other words, the signal processing circuit 110*a* and the signal processing circuit 110*e* are arranged in translational symmetry, and the signal processing circuit 110*b* and the signal processing circuit 110*f*** are arranged in translational symmetry.

According to the present exemplary embodiment, the signal processing circuit **110*a* and the signal processing circuit 110*b* can share the power supply line, and the signal processing circuit 110*e* and the signal processing circuit 110*f*** can share the power supply line, which leads to a reduction in the circuit area as compared with the fourth exemplary embodiment.

Figure 8:
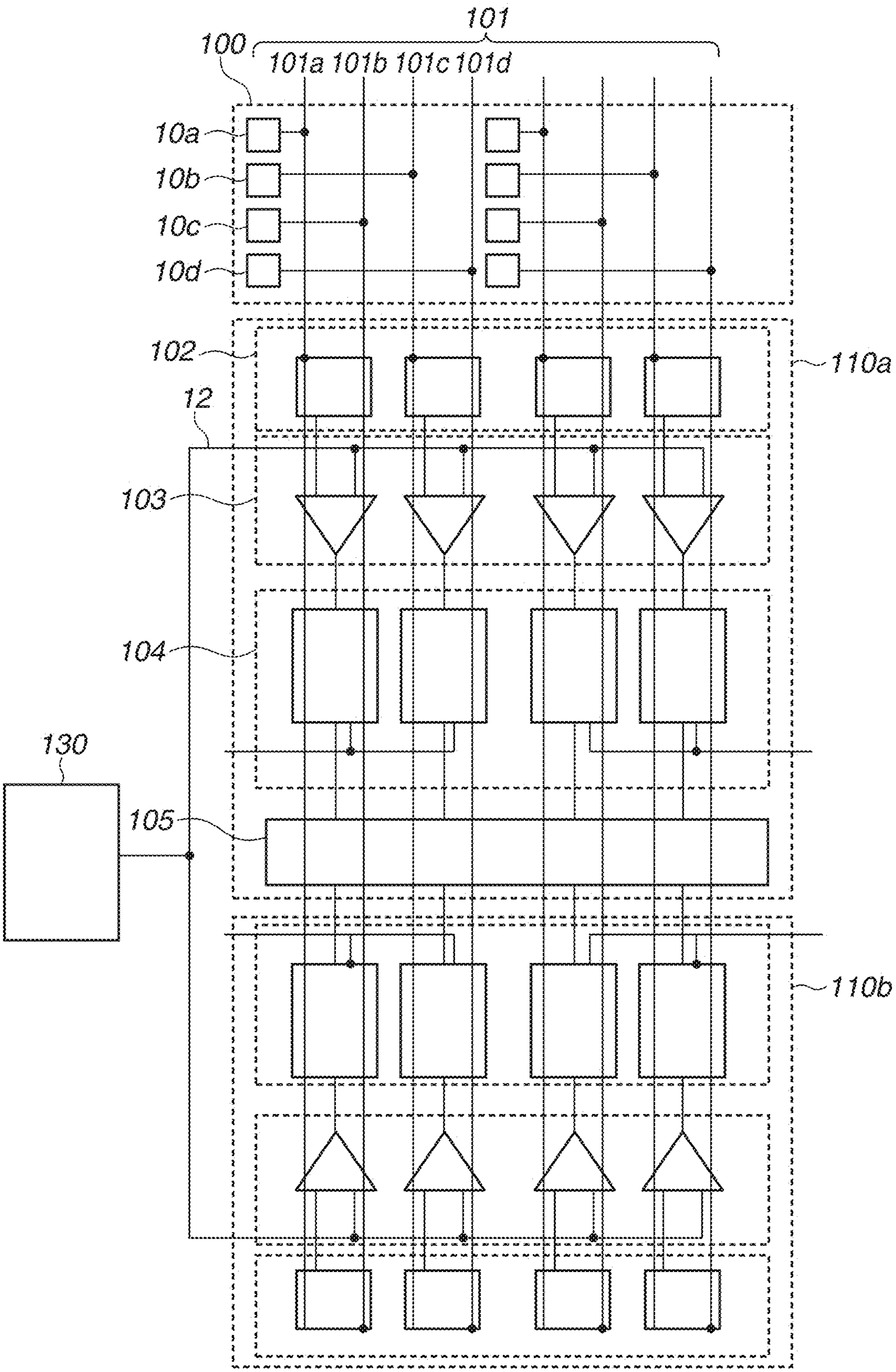
FIG. 8 is a diagram illustrating a detailed configuration of a circuit in a radiation detector according to a sixth exemplary embodiment.

FIG. 8 illustrates a radiation detector according to a sixth exemplary embodiment. The radiation detector according to the sixth exemplary embodiment differs from the radiation detector according to the first exemplary embodiment in that the horizontal scanning circuit 105 of the signal processing circuit **110*a* also functions as the horizontal scanning circuit 105 of the signal processing circuit 110*b***. The sixth exemplary embodiment is substantially the same as the first exemplary embodiment except for this difference and differences described below. For conciseness, description of similar components is incorporated by reference herein.

In the sixth exemplary embodiment, the adjacent signal processing circuits 110 share one horizontal scanning circuit 105. In the sixth exemplary embodiment, the signal processing circuit **110*b* is disposed in a vertically inverted manner with respect to the signal processing circuit 110*a*. The horizontal scanning circuit 105 is shared between the signal processing circuit 110*a* and the signal processing circuit 110*b*, and thus one horizontal scanning circuit 105 is used to control transfer of signals from the holding circuit 104 of the signal processing circuit 110*a* and the holding circuit 104 of the signal processing circuit 110*b***.

According to the present exemplary embodiment, the number of horizontal scanning circuits 105 can be reduced as compared with the first exemplary embodiment, which leads to a reduction in the area of the horizontal scanning circuits 105. Further, since one horizontal scanning circuit 105 is shared between the signal processing circuits 110, variations in transfer of pixel signals to the digital signal processing circuits 140 can be reduced.

While FIG. 8 illustrates one horizontal scanning circuit 105 that is shared between the signal processing circuits **110*a* and 110*b* and is disposed between the signal processing circuit 110*a* and the signal processing circuit 110*b***, the configuration according to the present exemplary embodiment is not limited thereto.

As a seventh exemplary embodiment, a radiation imaging system incorporating a radiation detector will be described with reference to FIG. 9.

Figure 9:
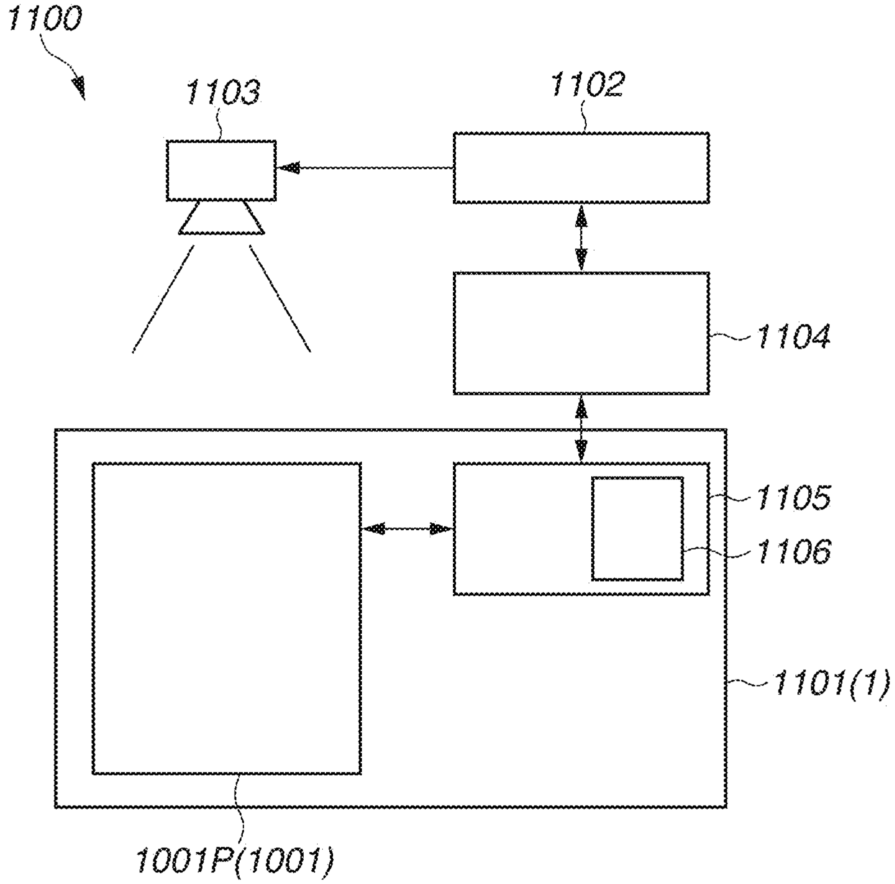
FIG. 9 is a block diagram illustrating a radiation imaging system according to a seventh exemplary embodiment.

A radiation imaging system 1100 illustrated in FIG. 9 includes a radiation imaging apparatus 1101, an exposure control unit 1102, a radiation source 1103, and a computer 1104. As the radiation imaging apparatus 1101, any one of the radiation detectors according to the first to sixth exemplary embodiments may be used.

The radiation source 1103 starts emission of radiation according to an exposure instruction from the exposure control unit 1102. The radiation emitted from the radiation source 1103 is transmitted through an imaging target (subject) and is incident on an imaging device 1001 of the radiation imaging apparatus 1101. The radiation source 1103 stops emission of radiation according to a stop instruction from the exposure control unit 1102.

The radiation imaging apparatus 1101 is, for example, a flat panel detector used for radiographic imaging in a medical image diagnosis, a non-destructive inspection, or the like. The radiation imaging apparatus 1101 includes an imaging panel 1001P including a direct conversion type imaging device. The imaging panel 1001P of the radiation imaging apparatus 1101 may have a plate shape with a size corresponding to the size of the imaging target. For example, the imaging device 1001 may include a substrate with a size of 550 mm×445 mm in which 3300×2800 pixels are arranged.

The radiation imaging apparatus 1101 includes the above-described imaging panel 1001P, a control unit 1105, also referred to as a controller, for controlling the imaging panel 1001P, and a signal processing unit 1106 for processing signals output from the imaging panel 1001P. The signal processing unit 1106 may obtain background components of pixel signals output from the imaging panel 1001P and may perform processing of subtracting the background components from the pixel signals. Further, the signal processing unit 1106 may perform, for example, AD conversion on the signals output from the imaging panel 1001P and may output the signals as digital image data to the computer 1104. Further, the signal processing unit 1106 may generate a stop signal for stopping emission of radiation from the radiation source 1103 based on, for example, the signals output from the imaging panel 1001P. The stop signal is supplied to the exposure control unit 1102 via the computer 1104, and the exposure control unit 1102 sends a stop instruction to the radiation source 1103 in response to the stop signal.

The control unit 1105 may be composed of, for example, a programmable logic device (PLD) such as a field programmable gate array (FPGA), an application-specific integrated circuit (ASIC), a general-purpose computer including built-in programs, or a combination of all or some of these devices.

In the present exemplary embodiment, the signal processing unit 1106 is disposed in the control unit 1105, or functions as a part of the control unit 1105. However, the configurations of the control unit 1105 and the signal processing unit 1106 are not limited thereto. The control unit 1105 and the signal processing unit 1106 may be configured separately. Further, the signal processing unit 1106 may be provided separately from the radiation imaging apparatus 1101. For example, the computer 1104 may include the function of the signal processing unit 1106. Accordingly, the signal processing unit 1106 may be included in the radiation imaging system 1100 as a signal processing device that processes signals output from the radiation imaging apparatus 1101.

The computer 1104 may perform processing for controlling the radiation imaging apparatus 1101 and the exposure control unit 1102, receiving radiation image data from the radiation imaging apparatus 1101, and displaying the received radiation image data as a radiation image. The computer 1104 may also function as an input unit for a user to input conditions for capturing a radiation image.

For example, the exposure control unit 1102 includes an exposure switch. When the user turns on the exposure switch, the exposure control unit 1102 sends an exposure instruction to the radiation source 1103 and sends a start notification indicating start of emission of radiation to the computer 1104. The computer 1104 that has received the start notification transmits a notification indicating the start of emission of radiation to the control unit 1105 of the radiation imaging apparatus 1101 in response to the start notification. In response to this notification, the control unit 1105 causes the imaging panel 1001P to generate a signal corresponding to the incident radiation.

As an eighth exemplary embodiment, another example of the radiation imaging system incorporating the radiation detector will be described with reference to FIGS. 10A and 10B.

Figure 10A:
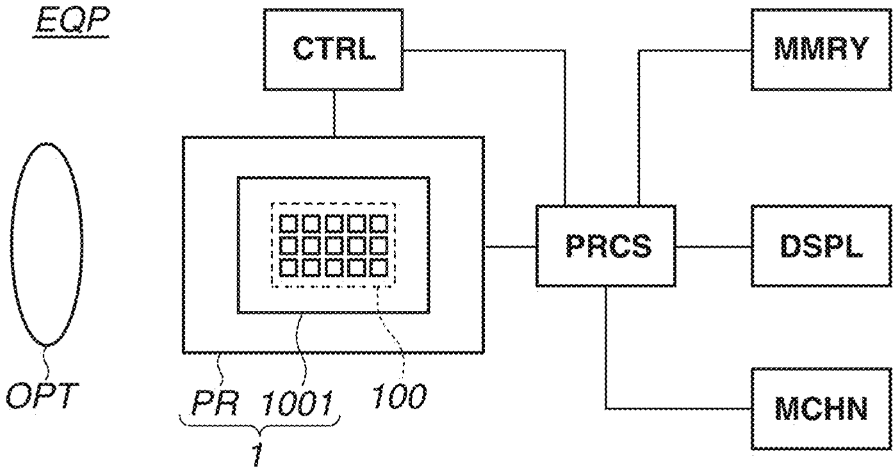
FIGS. 10A and 10B are block diagrams each illustrating a radiation imaging system according to an eighth exemplary embodiment.

FIG. 10A illustrates equipment EQP as a radiation imaging system including a radiation detector 1. The radiation detector 1 includes the imaging device 1001 that is a semiconductor device and a package for mounting the imaging device 1001.

The package may include a base member to which the imaging device 1001 is fixed, a lid, such as a glass lid, that is opposed to the imaging device 1001, and a connection member, such as a bonding wire and a bump, that connects a terminal provided on the substrate with a terminal provided on the imaging device 1001. The imaging device 1001 includes the pixel region 100 in which the pixels 10 are arrayed in a matrix and a peripheral region PR that is disposed in the vicinity of the pixel region 100. In the peripheral region PR, the vertical scanning circuits 120, the signal processing circuits 110, and the like according to the first to sixth exemplary embodiments can be disposed.

The equipment EQP may further include at least one of an optical system OPT, a control device CTRL, a processing device PRCS, a display device DSPL, a storage device MMRY, and a mechanical device MCHN. The optical system OPT is used to form an image from radiation on the radiation detector 1 and is, for example, a lens, a shutter, or a mirror. The optical system OPT may also be used to form an image from, for example, particle beams such as an electron beam and a proton beam on the radiation detector 1 depending on the type of radiation to be handled. The control device CTRL is used to control the radiation detector 1 and is, for example, an ASIC. The processing device PRCS is used to process signals output from the radiation detector 1, and is a device such as a central processing unit (CPU) and an ASIC for forming an analog front-end (AFE) or a digital front-end (DFE). The display device DSPL displays information obtained by the radiation detector 1 in a format such as a visible image. The display device DSPL is, for example, an electroluminescence (EL) display device or a liquid crystal display device. The storage device MMRY stores information obtained by the radiation detector 1. The storage device MMRY is, for example, a magnetic device or a semiconductor device. The storage device MMRY may be a volatile memory, such as a static random access memory (SRAM) and a dynamic RAM (DRAM), or a nonvolatile memory, such as a flash memory and a hard disk drive. The mechanical device MCHN includes a movable unit or a propulsive unit, such as a motor and an engine.

The equipment EQP displays signals output from the radiation detector 1 on the display device DSPL, and transmits the signals to an external apparatus via a communication device included in the equipment EQP. Accordingly, the equipment EQP may include the storage device MMRY and the processing device PRCS in addition to a storage circuit and an arithmetic circuit included in the radiation detector 1. The mechanical device MCHN may be controlled based on signals output from the radiation detector 1.

The equipment EQP illustrated in FIG. 10A may be medical equipment such as an endoscope and a radiation diagnosis apparatus, measurement equipment such as a ranging sensor, or analytical equipment such as an electron microscope.

Figure 10B:
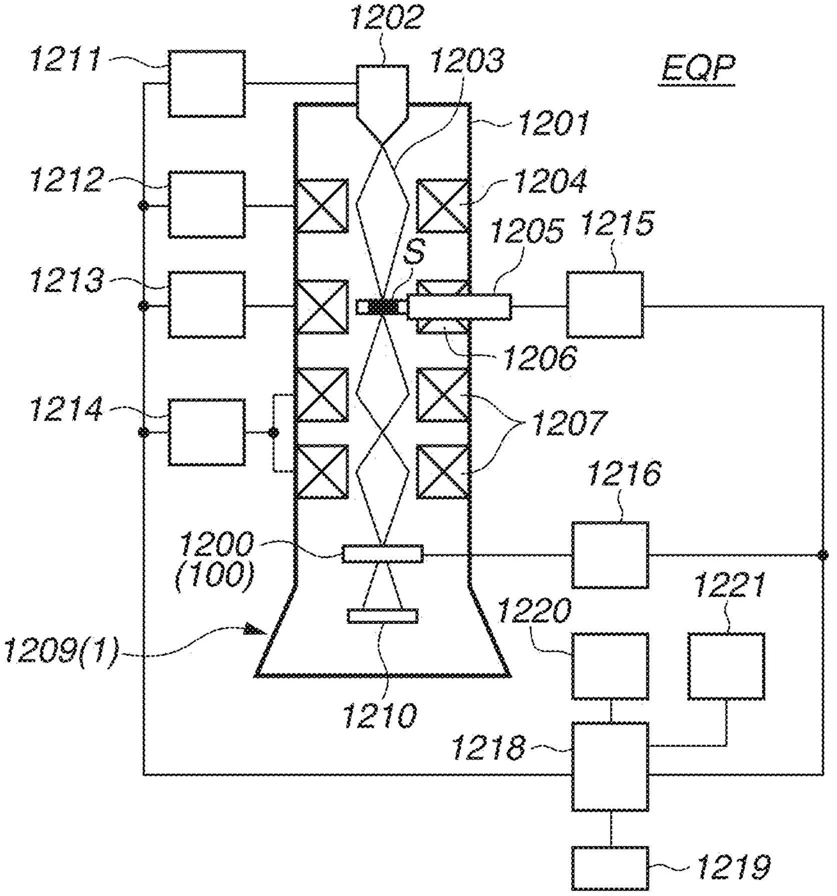

FIG. 10B is a schematic diagram illustrating a configuration of a transmission electron microscope (TEM) as an example of the equipment EQP. The equipment EQP serving as an electron microscope includes an electron beam source 1202 (electron gun), an irradiation lens 1204, a vacuum chamber 1201 (lens barrel), an objective lens 1206, a magnifying lens system 1207, and a camera 1209 serving as the radiation detector 1.

An electron beam 1203 that is an energy beam emitted from the electron beam source 1202 is concentrated by the irradiation lens 1204 and is emitted toward a sample S to be analyzed held in a sample holder. A space through which the electron beam 1203 passes is formed by the vacuum chamber 1201 (lens barrel), and the space is maintained to be a vacuum. The radiation detector 1 is disposed to face the vacuum space through which the electron beam 1203 passes. The electron beam 1203 that has passed through the sample S is magnified by the objective lens 1206 and the magnifying lens system 1207 and is projected onto the radiation detector 1. An electronic optical system for irradiating the sample S with an electron beam is referred to as an irradiation optical system, and an electronic optical system used to form an image from the electron beam that has passed through the sample S on the radiation detector 1 is referred to as an image forming optical system.

The electron beam source 1202 is controlled by an electron beam source control device 1211. The irradiation lens 1204 is controlled by an irradiation lens control device 1212. The objective lens 1206 is controlled by an objective lens control device 1213. The magnifying lens system 1207 is controlled by a magnifying lens system control device 1214. A control mechanism 1205 for the sample holder is controlled by a holder control device 1215 for controlling a sample holder drive mechanism.

The electron beam 1203 that has passed through the sample S is detected by a direct detector 1200 of the camera 1209. An output signal from the direct detector 1200 is processed by a signal processing device 1216 and an image processing device 1218 each serving as the processing device PRCS, thereby an image signal is generated. The generated image signal (transmitted electron image) is displayed on an image display monitor 1220 and an analysis monitor 1221 that correspond to the display device DSPL.

The camera 1209 is provided at a lower portion of the equipment EQP. The camera 1209 includes the direct detector 1200 (direct electron detector). The direct detector 1200 corresponds to the imaging device 1001. At least a part of the camera 1209 is disposed in the camera 1209 so that the part is exposed to the vacuum space formed by the vacuum chamber 1201.

The electron beam source control device 1211, the irradiation lens control device 1212, the objective lens control device 1213, the magnifying lens system control device 1214, and the holder control device 1215 are each connected to the image processing device 1218. This configuration enables mutual data exchange to set image capturing conditions for the electron microscope. For example, the irradiation rate of an electron beam can be set to be less than or equal to 0.5 electron/pix/frm.

In this case, the electron beam source control device 1211 and the image processing device 1218 each function as a control unit that controls the rate of radiation. Conditions for sample holder drive control and observation conditions for each lens can be set based on signals from the image processing device 1218.

An operator prepares the sample S to be an image capturing target, and sets the image capturing conditions using an input device 1219 connected to the image processing device 1218. Predetermined data is input to each of the electron beam source control device 1211, the irradiation lens control device 1212, the objective lens control device 1213, and the magnifying lens system control device 1214, so that a desired acceleration voltage, a desired magnification, and a desired observation mode can be obtained. Further, the operator inputs conditions, such as the number of field-of-view images to be continuously captured, an image capturing start position, and a moving speed of the sample holder, to the image processing device 1218 using the input device 1219 such as a mouse, a keyboard, and a touch panel. Instead of inputting conditions by the operator, the image processing device 1218 may automatically set the conditions.

The radiation imaging systems described above in the seventh and eighth exemplary embodiments are provided as examples, and the radiation detectors described in the first to sixth exemplary embodiments can also be applied to other systems.

The present disclosure can also be realized by processing in which a program for implementing one or more functions according to the above-described exemplary embodiments is supplied to a system or an apparatus via a network or a storage medium, and one or more processors in a computer of the system or the apparatus read and execute the program. The present disclosure can also be realized by a circuit (e.g., an ASIC) that implements one or more functions according to the exemplary embodiments.

The disclosed content includes a complementary set of concepts as described herein. More specifically, if there is a description that "A is B" (A=B), even if a description that "A is not B" (A≠B) is omitted, the description should be treated as disclosing or suggesting that "A is not B", since the description that "A is B" is based on the premise that "A is not B" is considered.

The exemplary embodiments described above can be modified, as needed, without departing from the technical idea of the present disclosure. More specifically, the present disclosure can be carried out in various forms without departing from the technical idea of the present disclosure and main features thereof. The exemplary embodiments can be combined as appropriate. For example, the fourth exemplary embodiment may be combined with the second exemplary embodiment so that the plurality of signal processing circuits 110 is disposed above and below the pixel region 100. The present disclosure is not limited to matters described herein, and includes all matters that would be recognized by one of ordinary skill in the art based on the present description and the accompanying drawings. Further, a complementary set of concepts is described herein. More specifically, if "A is larger than B" is described, even if a description "A is not larger than B" is omitted, the description is understood to include "A is not larger than B". This is because, in a case where "A is larger than B" is described, a case where "A is not larger than B" is understood to be considered.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-007696, filed Jan. 22, 2024, which is hereby incorporated by reference herein in its entirety.

What is claimed is:

1. A radiation detector comprising:

a pixel region in which a plurality of pixels configured to convert radiation into electric charge is arranged in a first direction and a second direction intersecting the first direction;

a first output line connected to a first pixel among the plurality of pixels;

a second output line connected to a second pixel, the first pixel and the second pixel being arranged side by side in the first direction;

a first signal processing circuit connected to the first output line; and a second signal processing circuit connected to the second output line, wherein the first signal processing circuit includes:

a first drive circuit connected to the first output line;

a first analog-to-digital (AD) conversion circuit configured to compare signals from the first output line;

a first holding circuit configured to hold signals from the first AD conversion circuit; and a first scanning circuit configured to control transfer of signals from the first holding circuit, wherein the second signal processing circuit includes:

a second drive circuit connected to the second output line;

a second AD conversion circuit configured to compare signals from the second output line; and a second holding circuit configured to hold signals from the second AD conversion circuit, wherein the first signal processing circuit is disposed between the pixel region and the second signal processing circuit, viewed from a third direction orthogonal to the first direction and the second direction, and wherein, viewed from the third direction, the first scanning circuit is disposed between the pixel region and the second AD conversion circuit.

2. The radiation detector according to claim 1, wherein the second signal processing circuit further includes a second scanning circuit configured to control transfer of signals from the second holding circuit, and wherein, viewed from the third direction, the first scanning circuit is disposed between the pixel region and the second scanning circuit.

3. The radiation detector according to claim 1, wherein, viewed from the third direction, the first scanning circuit is disposed between the first AD conversion circuit and the second AD conversion circuit, and wherein the first scanning circuit controls transfer of signals from the second holding circuit.

4. The radiation detector according to claim 2, wherein, viewed from the third direction, the first drive circuit, the first AD conversion circuit, the first holding circuit, the first scanning circuit, the second drive circuit, the second AD conversion circuit, the second holding circuit, and the second scanning circuit are arranged in this order in the first direction.

5. The radiation detector according to claim 2, wherein, viewed from the third direction, the first drive circuit, the first AD conversion circuit, the first holding circuit, the first scanning circuit, the second scanning circuit, the second holding circuit, the second AD conversion circuit, and the second drive circuit are arranged in this order in the first direction.

6. The radiation detector according to claim 2, further comprising:

a third output line connected to a third pixel, with the first pixel, the second pixel, and the third pixel being arranged side by side in the first direction; and a third signal processing circuit connected to the third output line, wherein the third signal processing circuit includes:

a third drive circuit connected to the third output line;

a third AD conversion circuit configured to compare signals from the third output line;

a third holding circuit configured to hold signals from the third AD conversion circuit; and a third scanning circuit configured to control transfer of signals from the third holding circuit, and wherein, viewed from the third direction, the second scanning circuit is disposed between the first scanning circuit and the third scanning circuit.

7. The radiation detector according to claim 2, further comprising:

a third output line connected to a third pixel, with the first pixel, the second pixel, and the third pixel being disposed side by side in the first direction;

a third signal processing circuit connected to the third output line;

a fourth output line connected to a fourth pixel, with the first pixel, the second pixel, the third pixel, and the fourth pixel being disposed side by side in the first direction; and a fourth signal processing circuit connected to the fourth output line, wherein the third signal processing circuit includes:

a third drive circuit connected to the third output line;

a third AD conversion circuit configured to compare signals from the third output line;

a third holding circuit configured to hold signals from the third AD conversion circuit; and a third scanning circuit configured to control transfer of signals from the third holding circuit, wherein the fourth signal processing circuit includes:

a fourth drive circuit connected to the fourth output line;

a fourth AD conversion circuit configured to compare signals from the fourth output line;

a fourth holding circuit configured to hold signals from the fourth AD conversion circuit; and a fourth scanning circuit configured to control transfer of signals from the fourth holding circuit, wherein, viewed from the third direction, the second drive circuit, the second AD conversion circuit, the second holding circuit, the second scanning circuit, the third scanning circuit, the third holding circuit, the third AD conversion circuit, and the third drive circuit are arranged in this order in the first direction, wherein the first signal processing circuit and the second signal processing circuit are arranged in translational symmetry, and wherein the third signal processing circuit and the fourth signal processing circuit are arranged in translational symmetry.

8. The radiation detector according to claim 2, further comprising:

a third output line connected to a third pixel, with the first pixel, the second pixel, and the third pixel being arranged side by side in the first direction;

a third signal processing circuit connected to the third output line;

a fourth output line connected to a fourth pixel, with the first pixel, the second pixel, the third pixel, and the fourth pixel being located side by side in the first direction; and a fourth signal processing circuit connected to the fourth output line, wherein the third signal processing circuit includes:

a third drive circuit connected to the third output line;

a third AD conversion circuit configured to compare signals from the third output line;

a third holding circuit configured to hold signals from the third AD conversion circuit; and a third scanning circuit configured to control transfer of signals from the third holding circuit, wherein the fourth signal processing circuit includes:

a fourth drive circuit connected to the fourth output line;

a fourth AD conversion circuit configured to compare signals from the fourth output line;

a fourth holding circuit configured to hold signals from the fourth AD conversion circuit; and a fourth scanning circuit configured to control transfer of signals from the fourth holding circuit, wherein, viewed from the third direction, the first drive circuit, the first AD conversion circuit, the first holding circuit, the first scanning circuit, the second scanning circuit, the second holding circuit, the second AD conversion circuit, and the second drive circuit are arranged in this order in the first direction, wherein the first signal processing circuit and the third signal processing circuit are arranged in translational symmetry, and wherein the second signal processing circuit and the fourth signal processing circuit are arranged in translational symmetry.

9. The radiation detector according to claim 1, wherein the first output line and the second output line have a substantially uniform wiring length in the first direction.

10. The radiation detector according to claim 1, further comprising:

a reference signal generation circuit configured to input a common reference signal to a plurality of signal processing circuits, wherein the plurality of signal processing circuits includes the first signal processing circuit and the second signal processing circuit, arranged in the first direction with respect to the pixel region, and wherein the reference signal generation circuit is disposed at a position equidistant from a signal processing circuit closest to the pixel region and a signal processing circuit farthest from the pixel region among the plurality of signal processing circuits.

11. The radiation detector according to claim 1, further comprising:

a fifth pixel and a sixth pixel among the plurality of pixels;

a fifth output line connected to the fifth pixel;

a sixth output line connected to the sixth pixel;

a fifth signal processing circuit connected to the fifth output line; and a sixth signal processing circuit connected to the sixth output line, wherein the sixth pixel, the fifth pixel, the first pixel, and the second pixel are arranged in this order in the first direction, wherein the fifth signal processing circuit includes:

a fifth drive circuit connected to the fifth output line;

a fifth AD conversion circuit configured to compare signals from the fifth output line;

a fifth holding circuit configured to hold signals from the fifth AD conversion circuit; and a fifth scanning circuit configured to control transfer of signals from the fifth holding circuit, wherein the sixth signal processing circuit includes:

a sixth drive circuit connected to the sixth output line;

a sixth AD conversion circuit configured to compare signals from the sixth output line;

a sixth holding circuit configured to hold signals from the sixth AD conversion circuit; and a sixth scanning circuit configured to control transfer of signals from the sixth holding circuit, wherein, viewed from the third direction, the fifth scanning circuit is disposed between the pixel region and the sixth scanning circuit, and wherein, viewed from the third direction, the pixel region is disposed between the sixth scanning circuit and the first scanning circuit.

12. A radiation imaging system comprising:

a radiation source configured to irradiate an imaging target with radiation;

the radiation detector according to claim 1; and a controller configured to control an irradiation rate such that an average value of incident photons or radiation particles output by the radiation detector is less than or equal to 0.5 electrons per pixel per frame.

* * * * *